Patented July 26, 1938

2,124,688

UNITED STATES PATENT OFFICE 2,124,688

HYDROXY SECONDARY DISAZO DYES AND PROCESS FOR THEIR PREPARATION

Herbert W. Daudt, Wilmington, Del., and Harold E. Woodward, Penns Grove, N. J., assignors to E. I. du Pont de Nemours & Company, Wilmington, Del., a corporation of Delaware No Drawing. Application March 25, 1937, Serial No. 132,968

17 Claims. (Cl. 260—81)

This invention relates to azo dyestuffs, to processes of making the dyestuffs and to materials dyed therewith, and especially to hydroxy secondary disazo dyes, their esters and ethers.

Heretofore brown azo dyes suitable for dyeing wool have been described which resemble in some respects the dyes hereinafter to be described. However, they have various undesirable properties, being sensitive to alkali and showing a tendency to bleeding when wet. In general it is necessary to dye with them in acid baths. It is useful to have wool dyes which will operate in neutral baths, and it is desirable to provide new dyestuffs with improved properties and processes for producing the compounds.

It is an object of this invention to provide new dyes suitable for dyeing animal fibres, such as silk and wool, in neutral baths. Another object of the invention is to provide new wool dyes of desirable bright shades having good fastness to washing and fulling. Another object of the invention is to provide processes for making the new compounds. Other objects are to provide animal fibres dyed with the new compounds and processes of dyeing the same. Still other objects will be apparent from the following more detailed description of the invention.

The objects of the invention are accomplished generally by the following general procedure. A diazotized 4-nitro-4'-aminodiphenylamine-sulphonic acid is coupled to a coupling component, containing a primary amine group and having a free coupling position, which is non-adjacent to the amino group. The amino group must be capable of being diazotized after the monazo compound is formed. The monazo compound is diazotized and coupled with a hydroxy compound which may be a hydroxy aryl compound or a pyrazolone. This disazo dye may be used to make a modified dyestuff which results when the hydroxyl group is condensed with blocking agents, forming ethers and esters therewith.

The term aryl as used in the specification and claims refers generally to aromatic compounds of the benzene and naphthalene series.

The invention is illustrated but not limited by the following examples.

Example I 30.9 parts of 4-nitro-4'-amino-diphenylamine-2-sulfonic acid were dissolved in 500 parts of water at 60° C. with 5.3 parts of sodium carbonate and then 6.9 parts of sodium nitrite were added to the solution. This solution was then run during 30 minutes into 250 parts of normal HCl solution and enough ice was added to keep the temperature at 25–30° C.

21 parts of sodium acetate (crystals) were then added to the mixture containing the diazotized 4-nitro-4'amino-diphenylamine-2-sulphonic acid, and to this was added a solution containing 13.7 parts of cresidine (3-amino-4-methoxy toluene) in 200 parts of water and 50 parts of 2X normal HCl solution. After stirring for one hour 150 parts of 2X normal sodium carbonate solution were added to make the solution slightly alkaline. The monazo compound was then salted out with about 200 parts of sodium chloride. It was filtered and washed with 15% sodium chloride solution. The residue was dissolved in 500 parts of water at 90° C. and filtered with charcoal, to remove the excess cresidine.

This amino azo compound was then diazotized at 10° C. by adding 30 parts of 10X normal hydrochloric acid solution and 50 parts of 2X normal sodium nitrite solution and stirring for one hour. This diazo compound was then coupled with phenol in a solution containing 9.4 parts of phenol and 10 parts of 10X normal sodium hydroxide solution and 60 parts of 2X normal sodium carbonate solution in 500 parts of water. When the coupling was complete the dye was salted out at 70° C. with 10% sodium chloride, removed by filtration and dried. This product dyed wool an orange brown shade and is represented by the following formula:

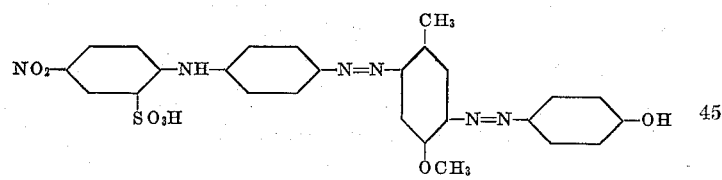

Different portions of the compound were condensed with para-toluene sulfon chloride and with diethyl sulfate by treatment at 60–70° C. in an alkaline solution and the ester and ether were obtained. These products dyed wool orange brown shades of good fastness to washing, fulling and alkaline perspiration. This dye can also be used to dye pure silk, tin weighted silk and acetate silk.

These compounds are represented by the following formulae:

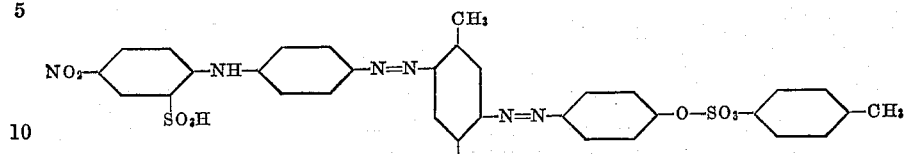

Example II

The mixture containing diazotized 4-nitro-4'-amino-diphenylamine-2-sulphonic acid described in Example I was neutralized and added to a solution containing 24.5 parts of the sodium salt of alpha-naphthylamine-7-sulphonic acid in 400 parts of water. After the coupling was complete, the mixture was made slightly alkaline with 9.0 parts of sodium carbonate and salted out at 60° C. with salt. The monazo dye was filtered off, and washed with a 10% salt solution. The monazo compound can be separated with good results from an alkaline or a neutral solution.

The monazo compound was then stirred into 1000 parts of water at 60° C., cooled to 30° C. with ice, and then diazotized by adding 25 parts of 10X normal hydrochloric acid solution and 50 parts of 2X normal sodium nitrite solution. After stirring ½ hour the mineral acidity was neutralized with 7.0 parts of sodium acetate crystals.

This diazotized compound was coupled with phenol by adding 9.4 parts of phenol and subsequently making the mixture alkaline with 8.0 parts of sodium carbonate. The disazo dye was salted out from the slightly alkaline medium at 70° C. with salt, filtered off and dried in a suitable manner. The product dyed wool a red brown. The compound is represented by the formula:

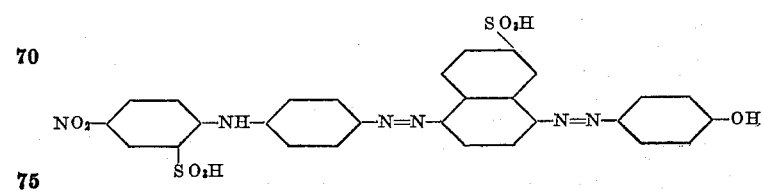

When the hydroxyl group was protected by condensation of the compound with an aromatic sulfon chloride, such as the sulphon chloride of benzene, para-toluene or beta-naphthalene, a reddish brown dye of good fastness to washing, fulling and alkaline perspiration was obtained. The type of compound is represented by the formula:

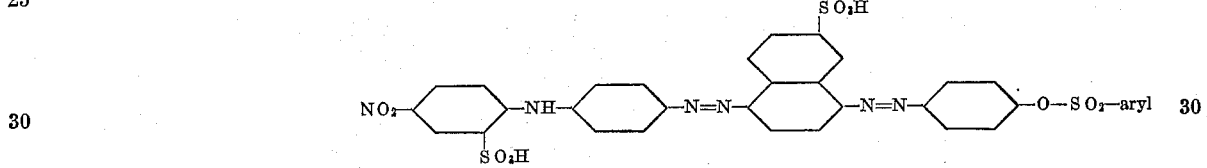

Example III 12.2 parts symmetrical xylenol (3:5-dimethyl-phenol) were used instead of 9.4 parts of phenol in the procedure of Example II.

The disazo product dyed wool red brown shades.

A portion of the product was condensed with p-nitro-benzoyl-chloride. The resulting brown colored product was isolated by filtration. It was much less sensitive to sodium hydroxide than the uncondensed compound. A part of it was used for dyeing wool. Brown dyeings were obtained. The latter compound is represented by the formula:

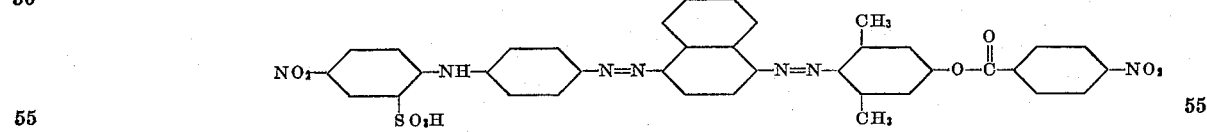

Example IV

The compound made in accordance with Example II by coupling 24.5 parts of sodium salt of alpha-naphthylamine-7-sulphonic acid with 30.9 parts of 4-nitro-4'-amino-diphenylamine-2-sulphonic acid was diazotized and coupled with 15 parts of salicylic acid. The salicylic acid was dissolved in a solution containing 200 parts of water and 50 parts of 2X normal sodium hydroxide solution. The reaction mixture was made alkaline by adding 200 parts of 2X normal sodium carbonate solution. After several hours stirring the disazo dye was salted out by adding salt, filtered and dried. The compound is represented by the following formula:

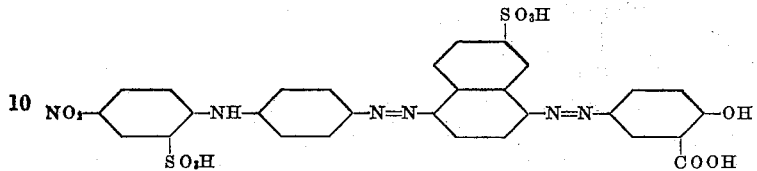

The dye gave a yellow brown dyeing on wool. When chromed, the dyeing was a strong yellow brown. The chromium complex compound of this dye was also made in substance by adding chromium fluoride to a solution of the product and boiling for 8 hours. It also dyed wool a yellow brown.

*Example V*

1-naphthylamine-6-sulfonic acid was used instead of 1-naphthylamine-7-sulfonic acid in Example II. A redder brown dye represented by the following formula was obtained.

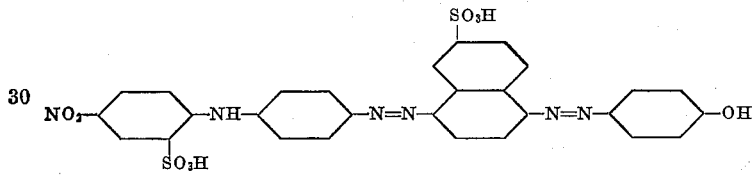

*Example VI*

Alpha-naphthylamine was used instead of 1-naphthylamine-7-sulfonic acid in Example II. A brown dye was obtained which is represented by the following formula

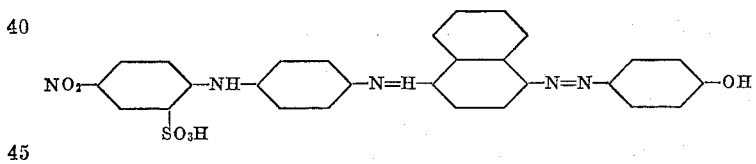

One portion of this disazo dye was condensed with para-toluene-sulphon-chloride and another portion was alkylated with dimethyl sulphate. The latter dyes were less sensitive to alkalies than the uncondensed disazo compounds. The products gave shades of brown dyeings on wool.

*Example VII*

A compound similar to the compound described in Example II was made by substituting 14.4 parts of beta-naphthol for the phenol used therein. The resulting hydroxy disazo compound which is represented by the following formula gave violet dyeings on wool.

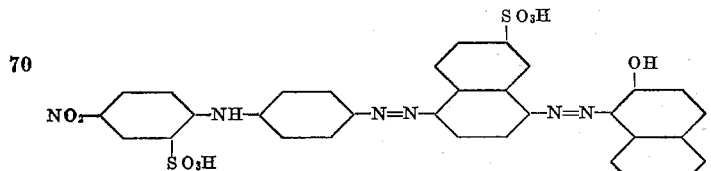

Other compounds of the same nature were made by using 1-naphthol-sulphonic acids, 2-hydroxy-naphthoic acids and amino-naphthol-sulphonic acids instead of the naphthol used in this example as the final component.

*Example VIII*

A portion of the hydroxy-disazo product obtained from 4-nitro-4'-amino-diphenylamine-2-sulphonic acid, 1-naphthylamine-7-sulphonic acid and phenol as described in Example II was converted to its ethyl ether by the following treatment. 0.01 mole part of the hydroxy-disazo compound was dissolved in 150 parts of water and heated to 65–70° C. The solution was treated with small amounts of diethyl-sulphate while maintaining the solution alkaline to brilliant yellow by additions of sodium hydroxide. The treatment was continued until a test portion was no longer sensitive to an aqueous solution of sodium hydroxide and the resulting ether was filtered off and dried.

Its wool dyeings were reddish brown in shade and were brighter than the corresponding para-toluene-sulphon-chloride condensation product made in accordance with Example II. The fastness properties were satisfactory. The compound is represented by the following formula:

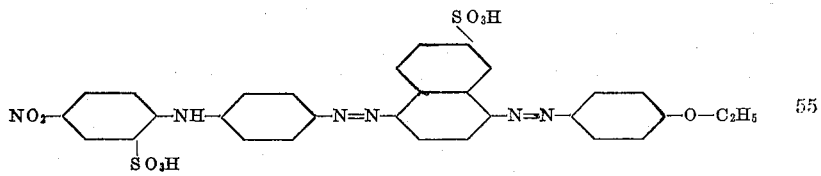

*Example IX*

The monazo compound made by coupling diazotized 4-nitro-4'-amino-diphenylamine-2-sulphonic acid with cresidine was separated from the reaction mixture, diazotized and then coupled as described in Example I using 17.7 parts of 1-phenyl-3-methyl-5-pyrazolone instead of 9.4 parts of phenol.

The product dyed wool a deeper shade of brown than the corresponding product of Example I and is represented by the following formula:

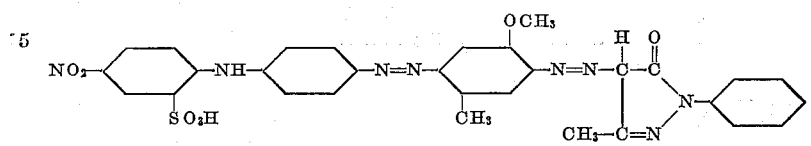

Example X 30.9 parts of diazotized 4-nitro-4'-amino-diphenylamine-2-sulphonic acid prepared as described in Example I were added to a solution containing 25 parts of 2-amino-8-naphthol-6-sulphonic acid, 4-parts of sodium hydroxide and 20 parts of sodium carbonate in 250 parts of water at 10° C.

The monazo compound was salted out of solution at 60° C. with 250 parts of salt, filtered and washed with 20% brine. The compound was redissolved in 500 parts of water and diazotized upon adding 120 parts of 2X normal hydrochloric acid and 45 parts of 2 normal sodium nitrite. After one hour the diazotized mixture was cooled to 10° C., and 9 parts of phenol were added, followed by 80 parts of 2X normal sodium hydroxide solution. The disazo color was salted out with about 100 parts of salt and filtered off.

The product is represented by the formula:

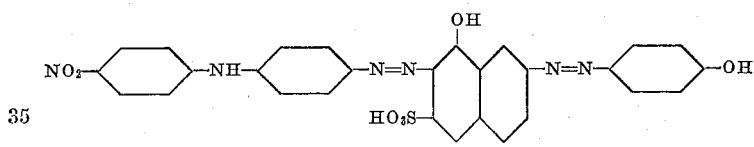

The disazo color was dissolved in 500 parts of water at 60° C. and treated for 1 hour with 120 parts of 2X normal sodium carbonate and 40 parts of p-toluene sulfon chloride at 60° to 70° C. After cooling to room temperature, the product was filtered off and dried.

The product dyed wool a violet brown of good fastness properties.

The final product is represented by the following formula:

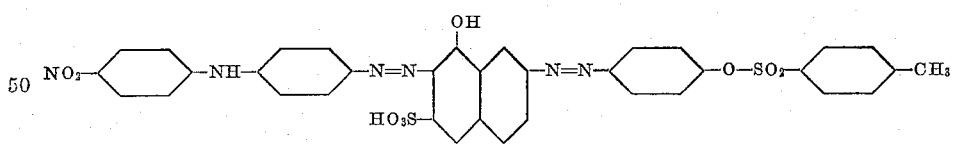

Considerable variation in the constituents used in preparing the dyes of the invention may be made. Thus some of the properties of the dyes are varied. For the first component an isomer of the nitro-amino-diphenylamine-sulphonic acid mentioned in the examples can be used. The nitro-amino-diphenylamine-sulphonic acid may be substituted by other groups such as alkyl, alkoxy, halogen, nitro and another sulphonic acid group. In diazotizing the first component it is preferable to add the nitrite to an alkaline solution of the nitro-amino-diphenylamine-sulphonic acid and then add this mixture to a mineral acid solution as more specifically described in the examples.

The first coupling or middle component consists of a member of the type of primary aryl amino derivatives, ordinarily used as middle components in secondary disazo dyes. The coupling must take place in a position that is not adjacent to the primary amino group and the amino group must be capable of being diazotized after the coupling. Other substituent groups may be present, such as alkyl, alkoxy, acyl-amino (—NH acyl), aryl, halogen, carboxyl and sulphonic acid so long as they do not interfere with the coupling and subsequent diazotization of the monazo compound. Among the intermediates which may be used are aniline (coupled by means of its omega-suphonic-acid derivative), meta-toluidine, cresidine, 2:5-dimethoxy-aniline, alpha-naphthylamine, 1:6 and 1:7 Cleve's acids and mixtures thereof, 2-amino-6-naphthols, 2-amino-7-naphthols, 2-amino-8-naphthol-6-sulphonic acid, 2-amino-8-naphthol-3,6-disulphonic acid, 2-amino-5-naphthol-7-sulphonic acid, and 1-amino-5-naphthol-7-sulphonic acid. It is preferred to use as the second component a primary aryl amine having a free coupling position para to the amino group.

For the end coupling component hydroxy aryl compounds of the benezene and naphthalene series, pyrazolones and their substituted products can be used. These compounds may be substituted by a variety of groups so long as the groups do not interfere with the coupling, such as alkyl, alkoxy, halogen, amino, carboxy and sulphonic acid. As examples of such compounds are mentioned 3-hydroxy-anisol, resorcin, 2-hydroxy-3-naphthoic acid and N-phenyl-2-amino-5-naphthol-7-sulphonic acid. However, phenols and substituted phenols have given the best results.

The preferred mode of protecting or blocking the hydroxyl of the end group of the disazo compound comprises the condensation of the hydroxyl with compounds to form ester and ether groups. By blocking is meant the conversion of the hydroxyl group to a neutral un-ionizable group, that is incapable of forming alkali salts with alkaline substances. Esters are preferably formed by condensing with alkyl or aryl sulphonic acid compounds, such as aryl-sulfon-halides or with an acylating compound, i. e. compounds which introduce —CO-alkyl or —CO-aryl groups. Examples are alkyl or aryl carboxyic acid compounds, such as acetic anhydride or an aroyl halide. Ethers are formed by condensing with alkylating compounds, such as dialkyl sulphates and alkyl halides.

The aryl-sulfon-halide may be a benzene or naphthalene derivative and may be substituted as by an alkyl group. Aroyl halides containing a benzene or naphthalene nucleus can be used. For example, benzoyl bromide or 2-naphthoyl chloride can be used instead of p-nitro-benzoyl-chloride mentioned in Example III.

The alkyl group present in the alkylating or in the acylating compound may contain from 1 to 12 carbon atoms, but preferably contains 1 to 3 carbon atoms.

The following general formula represents the constitution of the preferred combinations:

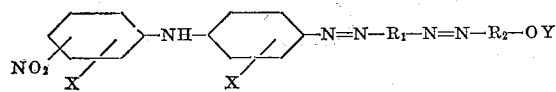

where one X represents —H and the other represents —SO₃H. R₁ is an unsubstituted or substituted benzene or naphthalene nucleus. R₂ is the residue of a hydroxy aryl compound and Y is H, alkyl, acyl or —SO₂ aryl.

For the purposes of dyeing silk and wool in neutral baths the esters and ethers of the disazo compounds are preferred, such as those in which the hydroxy of the end component is protected by condensation with an aryl sulphon halide an aroyl halide or an alkyl sulphate. In preparing the disazo compound the best results are obtained by isolating the monazo product from a neutral or alkaline solution.

For dyeing 100 parts of wool in neutral bath about 1 part of dye may be used in a solution containing about 10 parts of sodium sulphate crystals in 100 parts of water. The procedure may desirably consist of turning over the wool in the solution for about 10 minutes at room temperature, heating the dye bath over a period of about 15 minutes to a temperature approximating 90° to 100° C. and holding the solution at this temperature whilst turning over the wool therein for about 30 minutes. The material is then taken out. If the wool is to be chromed a solution of 1 part of sodium bichromate crystals in 25 parts of water is added, and brought to about 90° to 100° C. Without drying the material is again turned over in the solution for about 30 minutes, removed, rinsed, wrung and dried. If desired, the dyed material can be rinsed, wrung and dyed before it is chromed. The bichromate solution can also be applied before or during the application of the dye.

In preparing the monazo compounds in acid coupling medium it is to be understood that neutralization of the free acid therein before separating the monazo compound is not essential since this compound can be separated from the acidic medium. However, we prefer to make this coupling medium non-acid, that is neutral or alkaline before separating the monazo compound since it has been found that the preferred procedure as recited in the examples results in the production of purer and brighter intermediate and end products than are produced when the monazo compound is separated from the acid medium.

As numerous variations besides those which have been specifically mentioned can be made without departing from the spirit and scope of the invention as will be understood by those skilled in the art, it is to be understood that no limitations are intended in the annexed claims except those which are specifically recited or are imposed by the prior art.

We claim:

1. A compound made by coupling a diazotized nitro-amino-diphenylamine-sulphonic acid with a primary aryl amine from the benzene and naphthalene series having a free coupling position non-adjacent to the amino group which is diazotizable when coupled, diazotizing the product of coupling and coupling with a hydroxy coupling component from the group consisting of hydroxy benzene compounds, beta hydroxy naphthalene compounds and pyrazolone compounds.

2. A compound made by coupling a diazotized 4-nitro-4'-amino-diphenylamine-sulphonic acid with a primary aryl amine from the benzene and naphthalene series having a free coupling position non-adjacent to the amino group which is diazotizable when coupled, diazotizing the product of coupling and coupling with a hydroxy coupling component of the group consisting of hydroxy benzenes, beta hydroxy naphthalenes and pyrazolones.

3. A compound made by coupling a diazotized 4-nitro-4'-amino-diphenylamine-2-sulphonic acid with a primary aryl amine from the benzene and naphthalene series having a free coupling position non-adjacent to the amino group which is diazotizable when coupled, diazotizing the product of coupling and coupling with a hydroxy aryl compound of the group consisting of hydroxy benzenes, beta hydroxy naphthalenes and pyrazolones.

4. A compound made by coupling a diazotized 4-nitro-4'-amino-diphenylamine-2-sulphonic acid with a primary aryl amine from the benzene and naphthalene series having a free coupling position non-adjacent to the amino group which is diazotizable when coupled, diazotizing the product of coupling and coupling with a hydroxy benzene.

5. A compound made by coupling a diazotized 4-nitro-4'-amino-diphenylamine-sulphonic acid with a primary aryl amine from the benzene and naphthalene series which is substituted by at least one of the group consisting of alkyl, alkoxy, halogen, nitro and sulphonic acid, diazotizing said product of coupling, and then coupling with a hydroxy aryl compound of the group consisting of hydroxy benzenes, beta hydroxy naphthalenes and pyrazolones.

6. A compound made by coupling a diazotized nitro-amino-diphenylamine-sulphonic acid with a primary aryl amine of the benzene and naphthalene series having a coupling position para to the amino group, diazotizing the product of coupling and coupling the same with a hydroxy aryl compound of the group consisting of hydroxy benzenes, beta hydroxy naphthalenes and pyrazolones.

7. A compound made by coupling a diazotized nitro-amino-diphenylamine-sulphonic acid with a primary amine of the benzene series having a coupling position para to the amino group, diazotizing the product of coupling and coupling the same with a hydroxy aryl compound of the group consisting of hydroxy benzenes, beta hydroxy naphthalenes and pyrazolones.

8. A compound made by coupling a diazotized nitro-amino-diphenylamine-sulphonic acid with a primary amine of the naphthalene series having a coupling position para to the amino group, diazotizing the product of coupling and coupling the same with a hydroxy aryl compound of the group consisting of hydroxy benzenes, beta hydroxy naphthalenes and pyrazolones.

9. A compound made by coupling a diazotized nitro-amino-diphenylamine-sulphonic acid with an amino-naphthol-sulphonic acid having a coupling position non-adjacent to the amino group, diazotizing the product of coupling and coupling the same with a hydroxy aryl compound of the group consisting of hydroxy benzenes, beta hydroxy naphthalenes and pyrazolones.

10. A compound obtainable by coupling a diazotized amine represented by the formula

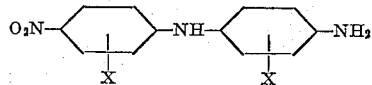

in which one X is sulfonic acid and the other X is hydrogen, with a primary aryl amine of the benzene series, the azo bridge being connected to said benzene nucleus in a position which is non-adjacent to the amino group, diazotizing the monazo compound thus produced, and then coupling to a compound represented by the formula

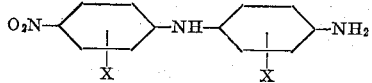

in which Z is one of the group consisting of hydrogen and alkyl and $n$ is an integer not greater than 2.

11. A compound in accordance with claim 10 in which Z is alkyl and $n$ is 2.

12. A compound obtainable by coupling a diazotized amine represented by the formula

in which one X is sulfonic acid and the other X is hydrogen, with a primary aryl amine of the benzene series, the azo bridge being connected to said benzene nucleus in a position which is non-adjacent to the amino group, diazotizing the monazo compound thus produced, and then coupling to symmetrical xylenol in a position para to the hydroxy group.

13. A compound obtainable by coupling diazotized 4-nitro-4'-amino-diphenylamine-2-sulfonic acid with a primary aryl amine from the benzene and naphthalene series in a coupling position non-adjacent to the amino group, diazotizing the product of coupling, and coupling to phenol in a position para to the hydroxy group.

14. A compound obtainable by coupling diazotized 4-nitro-4'-amino-diphenylamine-2-sulfonic acid with a compound represented by the formula

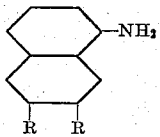

in which one R is sulfonic acid and the other R is hydrogen, said coupling being in a position para to the amino group, diazotizing the product of coupling, and coupling to phenol in a position para to the hydroxy group.

15. The process which comprises coupling a diazotized 4-nitro-4'-amino-diphenylamine-sulphonic acid and an aryl amine from the benzene and naphthalene series in a coupling position of said aryl amine which is non-adjacent to the amino group, diazotizing the product of coupling, and coupling said product in alkaline reaction medium with a hydroxy compound selected from the group consisting of the hydroxy benzenes, the beta hydroxy naphthalenes and the pyrazolones.

16. The process which comprises diazotizing a 4-nitro-4'-amino-diphenylamine-2-sulphonic acid, coupling with an aryl amine from the benzene and naphthalene series having a free coupling position non-adjacent to the amino group, diazotizing the amino azo compound thus produced, and coupling in alkaline solution said diazotized amino compound with a hydroxy aryl compound of the group consisting of hydroxy benzenes, beta hydroxy naphthalenes and pyrazolones.

17. The process in accordance with claim 15 in which a diazotized 4-nitro-4'-amino-diphenylamine-sulphonic acid and the aryl amine are coupled in acid medium, the medium is made non-acid and the monazo compound is separated therefrom.

HERBERT W. DAUDT.
HAROLD E. WOODWARD.

CERTIFICATE OF CORRECTION.

Patent No. 2,124,688.   July 26, 1938.

HERBERT W. DAUDT, ET AL.

It is hereby certified that error appears in the printed specification of the above numbered patent requiring correction as follows: Page 3, first column, lines 40 to 45 inclusive, Example VI, in the formula, for "N=H" read N=N; and that the said Letters Patent should be read with this correction therein that the same may conform to the record of the case in the Patent Office.

Signed and sealed this 27th day of September, A. D. 1938.

Henry Van Arsdale (Seal)   Acting Commissioner of Patents.